US008931723B2

(12) United States Patent
Tatsuma et al.

(10) Patent No.: US 8,931,723 B2
(45) Date of Patent: Jan. 13, 2015

(54) WEBBING TAKE-UP DEVICE

(71) Applicant: Kabushiki Kaisha Tokai-Rika-Denki-Seisakusho, Aichi-Ken (JP)

(72) Inventors: Atsushi Tatsuma, Aichi-ken (JP); Takahiro Osaki, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 0 days.

(21) Appl. No.: 14/032,810

(22) Filed: Sep. 20, 2013

(65) Prior Publication Data

US 2014/0084098 A1    Mar. 27, 2014

(30) Foreign Application Priority Data

Sep. 24, 2012 (JP) ................................. 2012-209950

(51) Int. Cl.
*B65H 75/48* (2006.01)
*B60R 22/34* (2006.01)
*B60R 22/44* (2006.01)

(52) U.S. Cl.
CPC ................. *B60R 22/34* (2013.01); *B60R 22/44* (2013.01); *B60R 2022/4453* (2013.01)
USPC .......................... 242/372; 242/375; 242/375.1

(58) Field of Classification Search
USPC ....................................... 242/372, 375, 375.1
See application file for complete search history.

(56) References Cited

U.S. PATENT DOCUMENTS

| 5,195,693 | A  | * | 3/1993  | Sasaki et al. | 242/372 |
| 6,431,485 | B2 | * | 8/2002  | Mitsuo et al. | 242/372 |
| 7,823,824 | B2 | * | 11/2010 | Benner        | 242/372 |
| 2013/0087649 | A1 | * | 4/2013 | Saito et al. | 242/371 |

FOREIGN PATENT DOCUMENTS

JP          2003-19946 A          1/2003

* cited by examiner

*Primary Examiner* — Sang Kim
(74) *Attorney, Agent, or Firm* — Roberts Mlotkowski Safran & Cole P.C.

(57) ABSTRACT

A webbing take-up device is obtained that is capable of reducing the load on a reduction balance spring without using special components, and without performing special processing on a spiral direction inside end of the reduction balance spring. When the reduction balance spring rotates in a take-up direction as winding of the reduction balance spring loosens, an inside engagement portion turns in the take-up direction inside an engagement groove. Accordingly, a load absorption portion which is further to a main body portion side of the reduction balance spring than the inside engagement portion curves into a concave shape that is open towards a pull-out direction as the load absorption portion stands up. In this state, when further load in the take-up direction acts on the reduction balance spring, this load is absorbed by the load absorption portion undergoing resilient deformation so as to curve further.

6 Claims, 4 Drawing Sheets

WEBBING TAKE-UP DEVICE

CROSS-REFERENCE TO RELATED APPLICATION

This application claims priority under 35 USC 119 from Japanese Patent Application No. 2012-209950, filed Sep. 24, 2012, the disclosure of which is incorporated by reference herein.

BACKGROUND OF THE INVENTION

1. Field of the Invention

The present invention relates to a webbing take-up device provided with a tension reducer capable of reducing a biasing force that biases a webbing that restrains the body of an occupant in a webbing take-up direction in an applied state of the webbing.

2. Related Art

Japanese Patent Application Laid-Open (JP-A) No. 2003-19946 (Patent Document 1) discloses a webbing take-up device (referred to in Patent Document 1 as a "seat belt winder for an automobile") in which a reduction balance spring (referred to in Patent Document 1 as a "sub power spring") is provided in addition to a take-up spring (referred to in Patent Document 1 as a "main power spring") that biases a spool (referred to in Patent Document 1 as a "seat belt winder shaft") in a take-up direction.

In a webbing take-up device such as that described in Patent Document 1, during transition of the reduction balance spring from a wound up state to a released state, a ratchet wheel rotates in a take-up direction relative to a ring due to resilient energy of the reduction balance spring, attempting to cause a portion in the vicinity of an inner end of the reduction balance spring to buckle in the radial direction outside. A special component referred to as a support member is accordingly used in the configuration described in Patent Document 1 in order to prevent or suppress such buckling of the portion in the vicinity of the inner end of the reduction balance spring.

SUMMARY OF THE INVENTION

In consideration of the above circumstances, the present invention is to obtain a webbing take-up device capable of reducing the load on a reduction balance spring without using a special component, and without performing special processing on a spiral direction inside end of the reduction balance spring.

A webbing take-up device according to a first aspect of the present invention includes: a spool that takes up a webbing; a take-up spring that biases the spool in a take-up direction that takes up the webbing; a reduction balance spring configured by a spiral spring, that is wound up due to a spiral direction inside end of the reduction balance spring rotating toward one side of a rotation direction with respect to a spiral direction outside end of the reduction balance spring; a first rotating body to which is anchored the spiral direction outside end of the reduction balance spring; a restricting section that restricts rotation of the first rotating body toward the one side of the rotation direction due to a tongue provided at the webbing being mounted to a buckle; and a second rotating body that is coaxial and capable of relative rotation with respect to the first rotating body, and that is coupled to the spool, the second rotating body rotating toward the one side of the rotation direction due to the spool rotating in the take-up direction, wherein: an engagement groove, into which is inserted the spiral direction inside end of the reduction balance spring, is formed at the second rotating body, the second rotating body rotates accompanying the spiral direction inside end, and inside the engagement groove, the spiral direction inside end is capable of moving in a circumferential direction of the rotation direction and in a radial direction of the rotation direction.

In the webbing take-up device of the first aspect, when an occupant pulls on the webbing in order to wear the webbing, the spool is rotated in the pull-out direction. Next, when the tongue provided to the webbing is mounted to the buckle in a pulled-out state of the webbing, the restricting section is actuated and engages with the first rotating body. Rotation of the first rotating body in the one side of the rotation direction is thereby restricted. In this state, when the pulling of the webbing by the occupant is released, the biasing force of the take-up spring rotates the spool in the take-up direction until the webbing is fitted to the body of the occupant.

When the spool thus rotates in the take-up direction, the second rotating body rotates in the one side of the rotation direction. The spiral direction inside end of the reduction balance spring that is configured by a spiral spring is inserted into the engagement groove formed to the second rotating body. When the second rotating body rotates in the one side of the rotation direction, the spiral direction inside end of the reduction balance spring rotates in the one side of the rotation direction accompanied by the second rotating body. Since the spiral direction outside end of the reduction balance spring is anchored to the first rotating body, when the spiral direction inside end of the reduction balance spring rotates in the one side of the rotation direction, the spiral direction outside end of the reduction balance spring attempts to rotate the first rotating body in the one side of the rotation direction.

However, in this state rotation of the first rotating body in the one side of the rotation direction is restricted by the restricting section. The reduction balance spring is accordingly wound up due to the spiral direction inside end of the reduction balance spring rotating in the one side of the rotation direction together with the second rotating body.

Note that the force rotating the spiral direction inside end of the reduction balance spring in the one side of the rotation direction via the second rotating body is the biasing force of the take-up spring. A portion of, or all of, the biasing force of the take-up spring is therefore cancelled out (offset) by the biasing force of the reduction balance spring. A feeling of pressure experienced by the occupant wearing the webbing due to the take-up spring biasing the spool in the take-up direction is accordingly reduced.

On the other hand, when the occupant takes the tongue out from the buckle in order for example to remove the webbing, the rotation restriction of the first rotating body by the restricting section is released. The first rotating body rotates in the one side of the rotation direction under the biasing force of the reduction balance spring, and the wind-up is released.

The relative positional relationship, with respect to the spiral direction inside end of the reduction balance spring, of the spiral direction outside end of the reduction balance spring returns to its initial state due to the wind-up of the reduction balance spring being released. However, the first rotating body attempts to rotate further in the one side of the rotation direction under inertia. This rotation force of the first rotating body is transmitted to the reduction balance spring, and the spiral direction inside end of the reduction balance spring moves in the one side of the rotation direction.

Note that the spiral direction inside end of the reduction balance spring is capable of moving, inside the engagement groove, in the circumferential direction and also in the radial direction of the second rotating body rotation. The spiral direction inside end of the reduction balance spring moves in the one side of the rotation direction, and during a time period until it contacts a face on the one side of the rotation direction of the engagement groove, the spiral direction inside end of the reduction balance spring rotates about an axis with axial direction in substantially the same direction as the rotation axis of the second rotating body.

Due to the spiral direction inside end of the reduction balance spring rotating in this manner, a portion of the reduction balance spring in the vicinity of the spiral direction inside end, which is further to the outside than the spiral direction inside end, becomes a curved (bent) state with a concave profile open towards the other side of the rotation direction, during the time period until the spiral direction inside end contacts the face on the one side of the rotation direction of the engagement groove.

In this state, when the spiral direction inside end of the reduction balance spring contacts the face on the one side of the rotation direction of the engagement groove, force received from the face of the engagement groove causes the portion in the vicinity of the spiral direction inside end which is further to the outside than the spiral direction inside end to undergo resilient deformation so as to curve further. Buckling of the spiral direction inside end of the reduction balance spring by the force from the face of the engagement groove can accordingly be effectively prevented or suppressed. A special component for preventing buckling of the spiral direction inside end of the reduction balance spring is thereby rendered unnecessary, enabling a reduction in costs.

A webbing take-up device according to a second aspect of the present invention includes: a spool that takes up a webbing; a take-up spring that biases the spool in a take-up direction that takes up the webbing; a reduction balance spring configured by a spiral spring, that is wound up due to a spiral direction inside end of the reduction balance spring rotating toward one side of a rotation direction with respect to a spiral direction outside end of the reduction balance spring; a first rotating body to which is anchored the spiral direction outside end of the reduction balance spring; a restricting section that restricts rotation of the first rotating body toward the one side of the rotation direction due to a tongue provided at the webbing being mounted to a buckle; and a second rotating body that is coaxial and capable of relative rotation with respect to the first rotating body, and that is coupled to the spool, the second rotating body rotating toward the one side of the rotation direction due to the spool rotating in the take-up direction; and an engagement groove that is formed at the second rotating body, and into which is inserted the spiral direction inside end of the reduction balance spring, the engagement groove being configured such that, at a time of release of winding up of the reduction balance spring, a portion of the reduction balance spring which portion is in the vicinity of the spiral direction inside end stands up so as to extend in a radial direction of the second rotating body while the spiral direction inside end moves inside the engagement groove before the spiral direction inside end contacts an inner face, which is at the one side in the rotation direction, of the engagement groove.

In the webbing take-up device of the second aspect, when an occupant pulls on the webbing in order to wear the webbing, the spool is rotated in the pull-out direction. Next, when the tongue provided to the webbing is mounted to the buckle in a pulled-out state of the webbing, the restricting section is actuated and engages with the first rotating body. Rotation of the first rotating body in the one side of the rotation direction is thereby restricted. In this state, when the pulling of the webbing by the occupant is released, the biasing force of the take-up spring rotates the spool in the take-up direction until the webbing is fitted to the body of the occupant.

When the spool thus rotates in the take-up direction in this manner, the second rotating body rotates in the one side of the rotation direction. The spiral direction inside end of the reduction balance spring that is configured by a spiral spring is inserted into the engagement groove formed at the second rotating body. When the second rotating body rotates in the one side of the rotation direction, the spiral direction inside end of the reduction balance spring rotates in the one side of the rotation direction accompanied by the second rotating body. Since the spiral direction outside end of the reduction balance spring is anchored to the first rotating body, when the spiral direction inside end of the reduction balance spring rotates in the one side of the rotation direction, the spiral direction outside end of the reduction balance spring attempts to rotate the first rotating body in the one side of the rotation direction.

However, in this state, rotation of the first rotating body in the one side of the rotation direction is restricted by the restricting section. The reduction balance spring is accordingly wound up due to the spiral direction inside end of the reduction balance spring rotating in the one side of the rotation direction together with the second rotating body.

Note that the force that rotates the spiral direction inside end of the reduction balance spring in the one side of the rotation direction via the second rotating body is the biasing force of the take-up spring. A portion of, or all of, the biasing force of the take-up spring is therefore cancelled out (offset) by the biasing force of the reduction balance spring. A feeling of pressure experienced by the occupant wearing the webbing due to the take-up spring biasing the spool in the take-up direction is accordingly reduced.

On the other hand, when the occupant takes the tongue out from the buckle in order for example to remove the webbing, the rotation restriction of the first rotating body by the restricting section is released. The first rotating body rotates in the one side of the rotation direction under the biasing force of the reduction balance spring and wind-up is released.

The relative positional relationship, with respect to the spiral direction inside end of the reduction balance spring, of the spiral direction outside end of the reduction balance spring returns to its initial state due to the wind-up is of the reduction balance spring being released. However, the first rotating body attempts to rotate further in the one side of the rotation direction under inertia. This rotation force of the first rotating body is transmitted to the reduction balance spring.

Note that when the wind-up of the reduction balance spring is released as described above, before the spiral direction inside end of the reduction balance spring contacts the inner face of the engagement groove which is at the one side of the rotation direction, the spiral direction inside end of the reduction balance spring moves inside the engagement groove, and a portion of the reduction balance spring which portion is in the vicinity of the spiral direction inside end and which portion is at the outside of the engagement groove, stands up so as to extend in a radial direction of the second rotating body. Resilient curving (bending) accordingly occurs in the standing up portion of the reduction balance spring.

Accordingly, when the spiral direction inside end of the reduction balance spring contacts the face at the one side of the rotation direction of the engagement groove, force received from the face of the engagement groove causes the portion of the reduction balance spring which is in the vicinity of the spiral direction inside end and which is further to the outside than the spiral direction inside end, to undergo resilient deformation so as to curve further. Buckling of the spiral direction inside end of the reduction balance spring due to the force from the face of the engagement groove can accordingly be effectively prevented or suppressed. A special component for preventing buckling of the spiral direction inside end of the reduction balance spring is thereby rendered unnecessary, enabling a reduction in costs.

A webbing take-up device according to a third aspect of the present invention is the webbing take-up device of either the first aspect or the second aspect, wherein: the spiral direction inside end of the reduction balance spring configures a hook shaped portion comprising a radial direction extension portion that extends from a main body portion of the reduction balance spring towards a center side in the radial direction of the second rotating body, and a circumferential direction extension portion that extends from an end portion of the radial direction extension portion, which end portion is at the opposite side from the main body portion, towards the one side of the rotation direction of the second rotating body; and the engagement groove is formed to comprise a radial direction groove whose one end opens at an outer peripheral face of the second rotating body, and whose another end is set at an inner side in the radial direction of the second rotating body, a groove width of the radial direction groove being set larger than a thickness dimension of the radial direction extension portion of the reduction balance spring that is inserted from the one end of the radial direction groove, and a circumferential direction groove whose base end is connected to the another end of the radial direction groove, and whose leading end is positioned further to the one side of the rotation direction of the second rotating body than the base end, a groove width of the circumferential direction groove being set larger than a thickness dimension of the circumferential direction extension portion of the reduction balance spring, and a length from the base end to the leading end of the circumferential direction groove being set longer than a length of the circumferential direction extension portion.

In the webbing take-up device of the third aspect, the spiral direction inside end of the reduction balance spring that is the portion inserted into the engagement groove of the second rotating body is provided with the radial direction extension portion that extends from the main body portion of the reduction balance spring towards the radial direction central side of the second rotating body. Moreover, the spiral direction inside end of the reduction balance spring is provided with the circumferential direction extension portion that extends from an opposite side end portion of the radial direction extension portion to the reduction balance spring main body portion towards the one side of the radial direction of the second rotating body. The spiral direction inside end portion of the reduction balance spring is thus bent or curved into an overall hook shape.

The engagement groove corresponding to the spiral direction inside end of the reduction balance spring is configured including the radial direction groove into which the radial direction extension portion of the spiral direction inside end is inserted, and the circumferential direction groove into which the circumferential direction extension portion of the spiral direction inside end is inserted.

In an inserted state of the spiral direction inside end of the reduction balance spring in the engagement groove, the spiral direction inside end can be restricted from coming out from the engagement groove even if the reduction balance spring attempts to move in a direction from the other end to the one end of the radial direction groove, due to the inner face of the circumferential direction groove contacting the circumferential direction extension portion.

In the engagement groove of the present invention, the groove widths (opening widths) of the radial direction groove and the circumferential direction groove are respectively set larger than the thickness dimension of the radial direction extension portion and the circumferential direction extension portion of the reduction balance spring. Moreover, the length from the base end to the leading end of the circumferential direction groove is set longer than the length of the circumferential direction extension portion of the reduction balance spring. The spiral direction inside end of the reduction balance spring is accordingly capable of turning, inside the engagement groove, about an axis with axial direction which is the same direction as the axial center of the second rotating body.

Accordingly, when wind-up of the reduction balance spring is released, a portion of the reduction balance spring which is further to the spiral direction outside than the spiral direction inside end of the reduction balance spring can be made to curve into a concave shape that is open towards the other side of the rotation direction before the radial direction extension portion of the reduction balance spring contacts the face on the one side of the rotation direction of the radial direction groove.

A webbing take-up device according to a fourth aspect of the present invention is the webbing take-up device of the third aspect, wherein: a shape of the circumferential direction groove is set such that the circumferential direction groove is curved with a center of curvature of the circumferential direction groove being further to a center side of the second rotating body than the circumferential direction groove of the second rotating body, and in a state in which the radial direction extension portion is in contact with a face of the radial direction groove which face is at the another side of the rotation direction, a portion at the base end side of the circumferential direction extension portion contacts a face of the circumferential direction groove which face is at a radial direction center side of the second rotating body, and the leading end of the circumferential direction extension portion contacts a face of the circumferential direction groove which face is at a radial direction outer side of the second rotating body.

In the webbing take-up device of the fourth aspect, the circumferential direction groove is curved, with the center of curvature being at further to the second rotating body central side than the location where the circumferential direction groove of the second rotating body is formed. When the spiral direction inside end of the reduction balance spring is inserted into the engagement groove and the radial direction extension portion contacts the face, at the other side of the rotation direction of the second rotation body, of the radial direction groove, the leading end of the circumferential direction extension portion can be made to contact the radial direction outside face of the circumferential direction groove and the base end side of the circumferential direction extension portion can be made to contact the radial direction inside face (the face at the radial direction center side of the second rotating body) of the circumferential direction groove. The spiral direction inside end of the reduction balance spring can accordingly be stabilized inside the engagement groove when the spiral direction inside end of the reduction balance spring has been inserted into the engagement groove.

A webbing take-up device of a fifth aspect of the present invention is the webbing take-up device of the fourth aspect, wherein the center of curvature of the circumferential direction groove is set as an axial center of the second rotating body.

In the webbing take-up device of the fifth aspect of the present invention, the center of curvature of the circumferential direction groove of the engagement groove is set as the axial center of the second rotating body. A dimension between the circumferential direction groove and an outer peripheral portion of the second rotating body can accordingly be made substantially uniform from the base end of the circumferential direction groove to the leading end of the circumferential direction groove. The rigidity and mechanical strength of the second rotating body at the portion where the circumferential direction groove is formed and the vicinity of this portion can accordingly be stabilized.

As explained above, the load on the reduction balance spring can be reduced without using special component, and without performing special working on the spiral direction inside end of the reduction balance spring.

BRIEF DESCRIPTION OF THE DRAWINGS

Embodiments of the invention will be described in detail with reference to the following figures, wherein:

FIGS. 4A to 4C are enlarged side views of a portion of an engagement groove of a second rotating body, wherein FIG. 4A illustrates a wound up state of a reduction balance spring, FIG. 4B illustrates a state in wherein a spiral direction inside end portion of the reduction balance spring has turned, and FIG. 4C illustrates a state in which the spiral direction inside end portion of the reduction balance spring has turned until the spiral direction inside end portion has contacted a face on one side of a rotation direction of the engagement groove.

DETAILED DESCRIPTION OF THE INVENTION

Present Exemplary Embodiment Configuration

Figure 1:
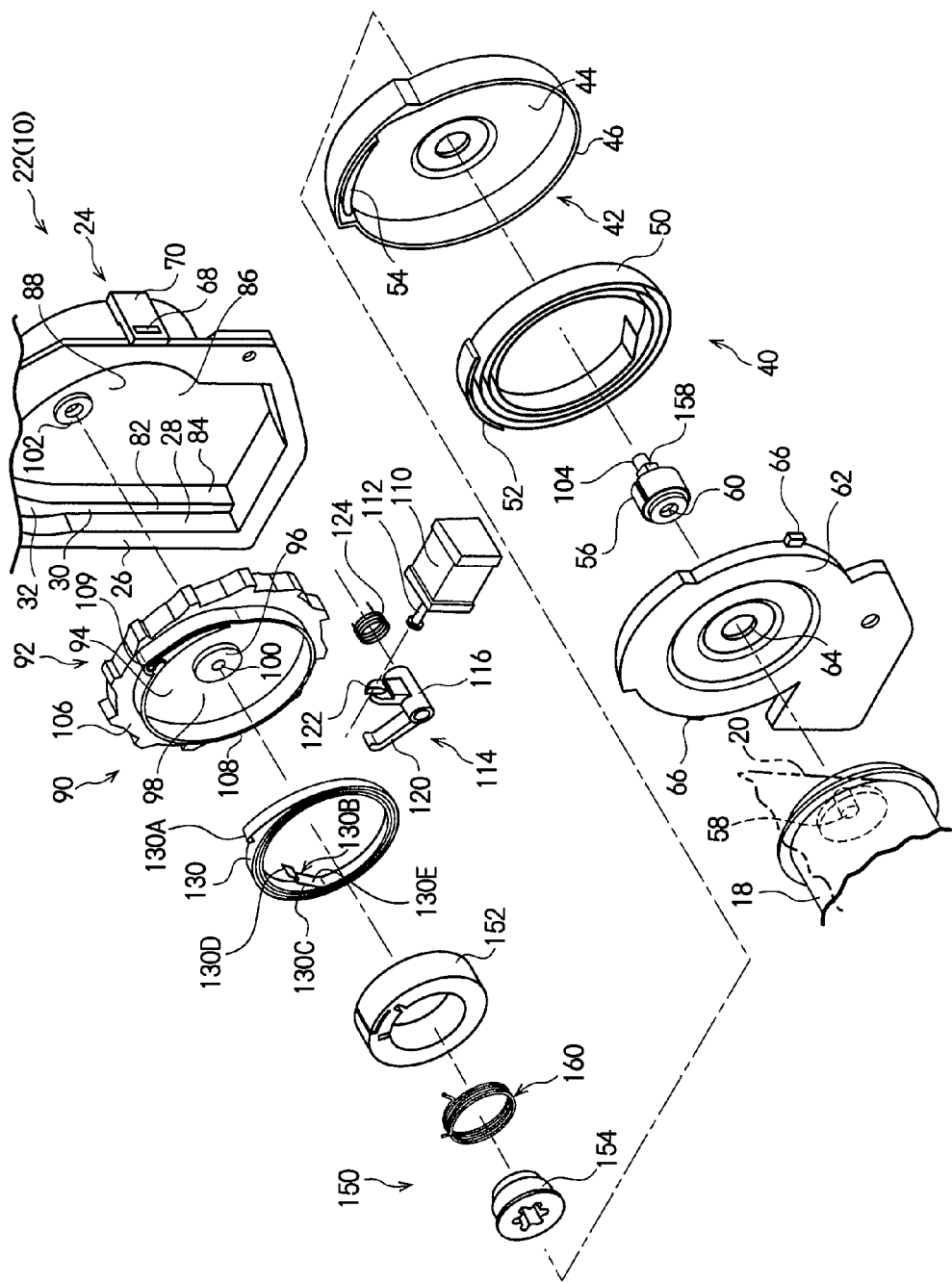
FIG. 1 is an exploded perspective view illustrating a configuration of relevant portions of a webbing take-up device according to an exemplary embodiment of the present invention.

FIG. 1 is an exploded perspective view illustrating configuration of main portions of a webbing take-up device 10 according to an exemplary embodiment of the present invention.

As illustrated in FIG. 1, the webbing take-up device 10 is provided with a spool 18. The spool 18 is provided between a pair of leg plates configuring a frame, not illustrated in the drawings. A length direction base end portion of an elongated strap shaped webbing 20 is anchored to the spool 18. The webbing 20 is taken up onto an outer peripheral portion of the spool 18 from a length direction base end side when the spool 18 rotates in a take-up direction that is one axis circumferential direction of the spool 18. When a leading end side of the webbing 20 is pulled, the webbing 20 that is taken up on the spool 18 is pulled out from the spool 18, whilst the spool 18 rotates in a pull-out direction that is the opposite direction to the take-up direction.

A case 24 configuring a tension reducer 22 is provided on one axial direction side of the spool 18. The case 24 is provided with a plate shaped base portion 26. The base portion 26 is fixed to the frame by fastening and fixing members such as screws, or fitting and fixing members such as bullet pins. The base portion 26 is formed with a hole of a specific profile, and a ring shaped peripheral wall 28 is formed following the periphery of the hole. An inner wall 30 is formed contiguously to the peripheral wall 28 at an end portion of the peripheral wall 28 on the opposite side to the base portion 26. The inner wall 30 is configured in a plate shape with the thickness direction oriented in the base portion 26 thickness direction. A space enclosed by the peripheral wall 28 on the base portion 26 side of the inner wall 30 configures a take-up spring unit housing portion 32.

A take-up spring unit 40 is disposed inside the take-up spring unit housing portion 32. The take-up spring unit 40 includes a spring cover 42 serving as a retaining body. The spring cover 42 is provided with a flat plate shaped bottom wall 44. A peripheral wall 46 projects from an outer peripheral portion of the bottom wall 44. The spring cover 42 is configured overall in a box shape that is open at one end. The outer peripheral profile of the spring cover 42 is slightly smaller than the inner peripheral profile of the take-up spring unit housing portion 32 (namely the inner peripheral profile of the peripheral wall 28), and the spring cover 42 is fitted inside of the take-up spring unit housing portion 32 in a rotation disabled state with respect to the case 24.

A take-up spring 50 is provided inside the spring cover 42. The take-up spring 50 is configured by a flat spiral spring with the direction from a spiral direction outside towards the spiral direction inside configured in the pull-out direction. The take-up spring 50 is formed with an anchor portion 52 where the take-up spring 50 is folded back on itself in the opposite direction in the vicinity of a spiral direction outside end portion. The anchor portion 52 is anchored to an anchor wall 54 that projects from the bottom wall 44. An inside end portion of the take-up spring 50 is anchored to an outer peripheral portion of an adaptor 56 that configures a rotation transmission member serving as a coupling member.

The adaptor 56 is configured in a circular columnar shape and is substantially coaxial to the spool 18. An end portion of the adaptor 56 that faces one axial direction end portion of the spool 18 is formed with a fitting hole 60 into which is fitted a coupling shaft portion 58 that is formed projecting coaxially from the spool 18. Fitting the coupling shaft portion 58 into the fitting hole 60 joins together the spool 18 and the adaptor 56 in a state in which the adaptor 56 is not capable of relative rotation with respect to the spool 18.

Accordingly, when the webbing 20 is pulled towards the leading end side, rotating the spool 18 in the pull-out direction, the spiral direction inside end portion of the take-up spring 50 rotates in the pull-out direction relative to the spiral direction outside end portion. The take-up spring 50 is accordingly wound up, thereby biasing the spool 18 towards the take-up direction. This biasing force (namely a take-up biasing force) increases the greater the amount by which the spiral direction inside end portion of the take-up spring 50 rotates in the pull-out direction relative to the spiral direction outside end portion.

A plate shaped seat 62 is provided at an opening side inside the spring cover 42 in which the take-up spring 50 is housed. A through hole 64 through which the adaptor 56 passes is formed in the seat 62. Fitting tabs 66 project from a portion of the outer periphery of the seat 62. The seat 62 is integrally attached to the frame by fitting the fitting tabs 66 together with the frame, thereby closing off the opening side of the take-up spring unit housing portion 32 and the opening side of the spring cover 42.

A hole portion 82 of a specific profile is moreover formed to the inner wall 30. A peripheral wall 84 is formed from the inner wall 30 following the periphery of the hole portion 82. An end portion of the peripheral wall 84 on the opposite side to the inner wall 30 is closed off by a bottom wall 86. The inside of the peripheral wall 84 to the inner wall 30 side of the bottom wall 86 configures a reducing spring unit housing portion 88. A reducing spring unit 90 is housed inside the reducing spring unit housing portion 88. The reducing spring unit 90 is provided with a ratchet gear 92 serving as a first rotating body.

The ratchet gear 92 is provided with a plate shaped bottom wall portion 94 with thickness direction oriented in the bottom wall 86 thickness direction. A boss 96 is formed at the center of the bottom wall portion 94. The boss 96 is formed in a bottomed cylinder shape and is open towards the bottom wall 86 side. One side of an axial direction intermediate portion of the boss 96 (boss 96 opening side) projects towards the bottom wall 86 side of the bottom wall portion 94, and the other side of the axial direction intermediate portion of the boss 96 (bottom portion 98 side of the boss 96) projects towards the opposite side to the bottom wall 86 of the bottom wall portion 94.

The inner peripheral profile of the boss 96 is formed in a circular shape that is coaxial to the circular shaped outer peripheral profile of the boss 96. The bottom portion 98 is formed with a through hole 100 that is coaxial to the inner peripheral profile of the boss 96. The through hole 100 penetrates the bottom portion 98, and is moreover configured with a circular conical shape with an inner diameter dimension becoming gradually smaller on progression towards an opening end of the bottom portion 98.

A support portion 102 is formed to the bottom wall 86 of the case 24 corresponding to the boss 96. The support portion 102 is formed in a circular cylinder shape with a profile that is coaxial to the spool 18 in an attached state of the case 24 to the frame. Note that a leading end side of the support portion 102 corresponds to the through hole 100 formed in the bottom portion 98 of the boss 96, and the support portion 102 is formed in a circular conical shape with an outer diameter dimension becoming gradually smaller on progression towards the leading end.

In a disposed state of the ratchet gear 92 inside the reducing spring unit housing portion 88 with the support portion 102 acting as a shaft, the boss 96 is rotatably supported on the outside of the support portion 102. The ratchet gear 92 is rotatably supported by the boss 96. A shaft portion 104 that is integrally formed to the adaptor 56 with a circular columnar shaped profile coaxial to the spool 18 is inserted inside the boss 96, thereby supporting the shaft portion 104 (namely the adaptor 56) so as to be capable of rotation.

A ratchet portion 106 is formed to an outer peripheral portion of the bottom wall portion 94. The ratchet gear 92 is configured in an overall dish shape (a bottomed cylinder shape of comparatively short axial direction dimension). A solenoid 110 serving as a restricting section is provided to the radial direction outside of the ratchet portion 106 (below the ratchet portion 106 in the present exemplary embodiment). The solenoid 110 is electrically connected to a battery installed to the vehicle through an ECU serving as a control unit.

The ECU is also electrically connected to a buckle switch provided to a buckle device that configures a seatbelt device together with the webbing take-up device 10. When the buckle switch has detected that a tongue plate provided to the webbing 20 has been mounted to the buckle device, the ECU places the solenoid 110 in a current flowing (energized) state. The solenoid 110 generates a magnetic field when the solenoid 110 has been placed in the current flowing state.

The solenoid 110 is provided with a plunger 112. The plunger 112 is formed from a magnetized body in a rod shape. A length direction base end side of the plunger 112 reaches inside the solenoid 110. When current flows in the solenoid 110 as described above, the magnetic field generated by the solenoid 110 pulls the plunger 112 further inside the solenoid 110.

A pawl 114 is provided at a leading end side of the plunger 112. The pawl 114 is provided with a circular cylinder portion 116. The circular cylinder portion 116 axial direction is disposed with the same orientation as the spool 18 axial direction. At least one end of the circular cylinder portion 116 is penetrated by a shaft portion that is supported by at least one out of the seat 62 and the case 24, with the pawl 114 supported so as to be capable of rotating (swinging) about the shaft portion. A rotation restricting tab 120 projects out from a portion of the outer periphery of the circular cylinder portion 116.

When the pawl 114 rotates in an engagement direction that is one axial circumferential direction of the shaft portion, a leading end of the rotation restricting tab 120 approaches an outer peripheral portion of the ratchet portion 106 and engages with the ratchet teeth of the ratchet portion 106. In an engaged state of the leading end of the rotation restricting tab 120 with the ratchet teeth of the ratchet portion 106, rotation of the ratchet gear 92 in the take-up direction is restricted. A coupling tab 122 moreover projects out from a portion of the outer periphery of the circular cylinder portion 116.

The pawl 114 is connected to the plunger 112 at the coupling tab 122. When the plunger 112 is pulled into the solenoid 110, the coupling tab 122 is pulled by the plunger 112 and the pawl 114 swings about the shaft portion in the engagement direction. One end of a return spring 124 is anchored to the pawl 114, biasing the pawl 114 in the opposite direction to the engagement direction, such that unless current is flowing in the solenoid 110, the leading end side of the rotation restricting tab 120 is maintained in a state separated from the outer peripheral portion of the ratchet portion 106.

The ratchet gear 92 is provided with a peripheral wall 108. The peripheral wall 108 projects out from the bottom portion 98 towards the spring cover 42 side so as to stand in a cylinder (tube) shape. A reduction balance spring 130 is disposed inside the peripheral wall 108. The biasing force of the reduction balance spring 130 is weaker than the biasing force of the take-up spring 50, and the reduction balance spring 130 is configured by a flat power spring with the direction from the spiral direction outside towards the spiral direction inside being oriented in the take-up direction.

Figure 3:
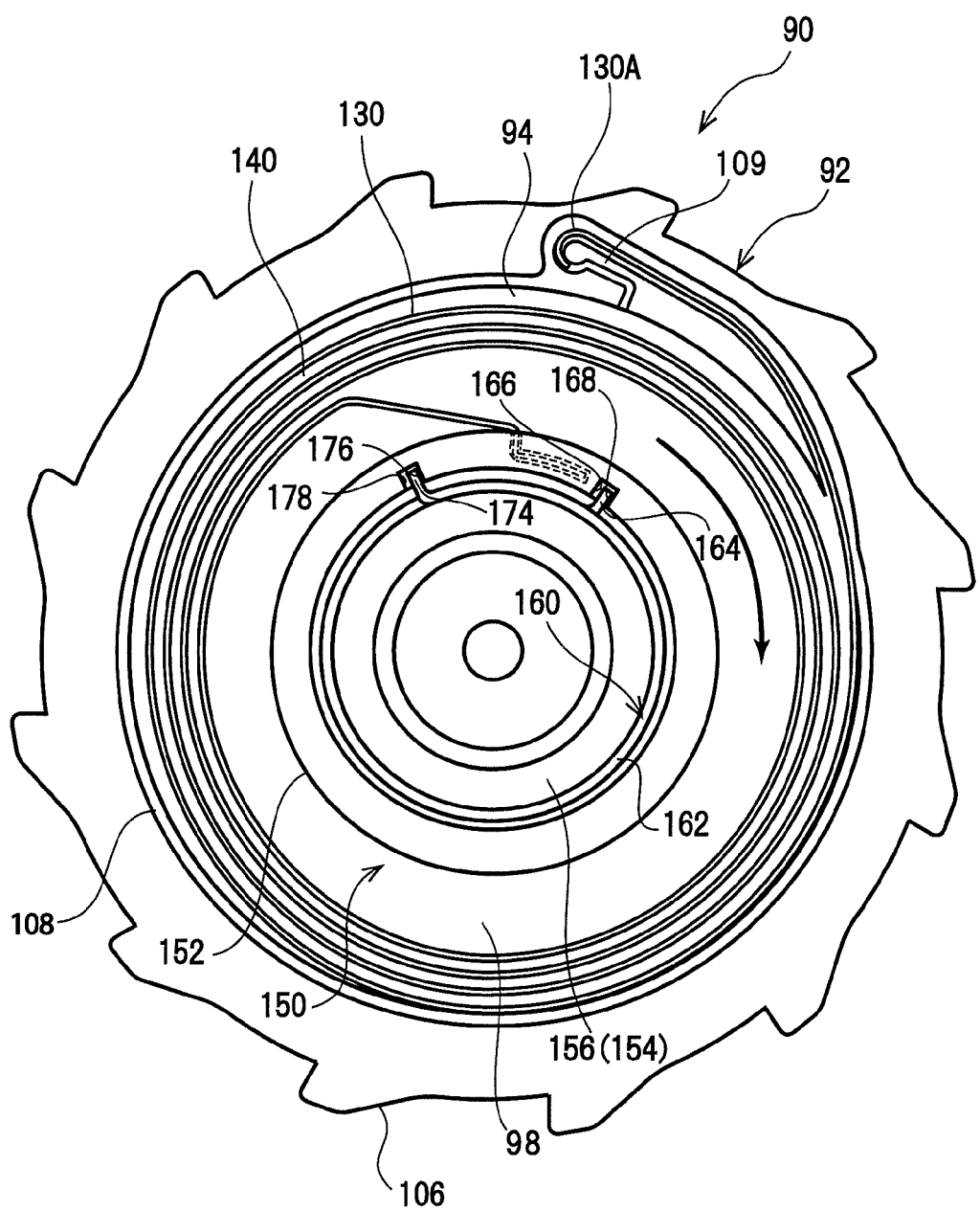
FIG. 3 is a side view of a first rotating body and portions in the vicinity thereof.

As illustrated in FIG. 3, an anchor wall 109 serving as an anchor portion is provided in stand manner from the bottom portion 98 so as to correspond to a spiral direction outside end portion of the reduction balance spring 130. The anchor wall 109 is formed inside the peripheral wall 108 in the vicinity of a portion of the peripheral wall 108. A catch portion 130A which is formed at the spiral direction outside end portion of the reduction balance spring 130 and in the vicinity of the spiral direction outside end portion of the reduction balance spring 130, are inserted into a gap between the anchor wall 109 and the peripheral wall 108, and is thereby anchored to the anchor wall 109.

A clutch 150 is provided further to the inside than a spiral direction innermost layer portion (the innermost portion of the spiral) of the reduction balance spring 130. The clutch 150 is provided with a ring 152 serving as a second rotating body. The ring 152 is formed overall in a circular cylinder shape. The ring 152 is supported by the boss 96 formed to the bottom wall portion 94 of the ratchet gear 92 so as to be coaxial to the ratchet gear 92 and capable of relative rotation with respect to the ratchet gear 92.

Figure 2:
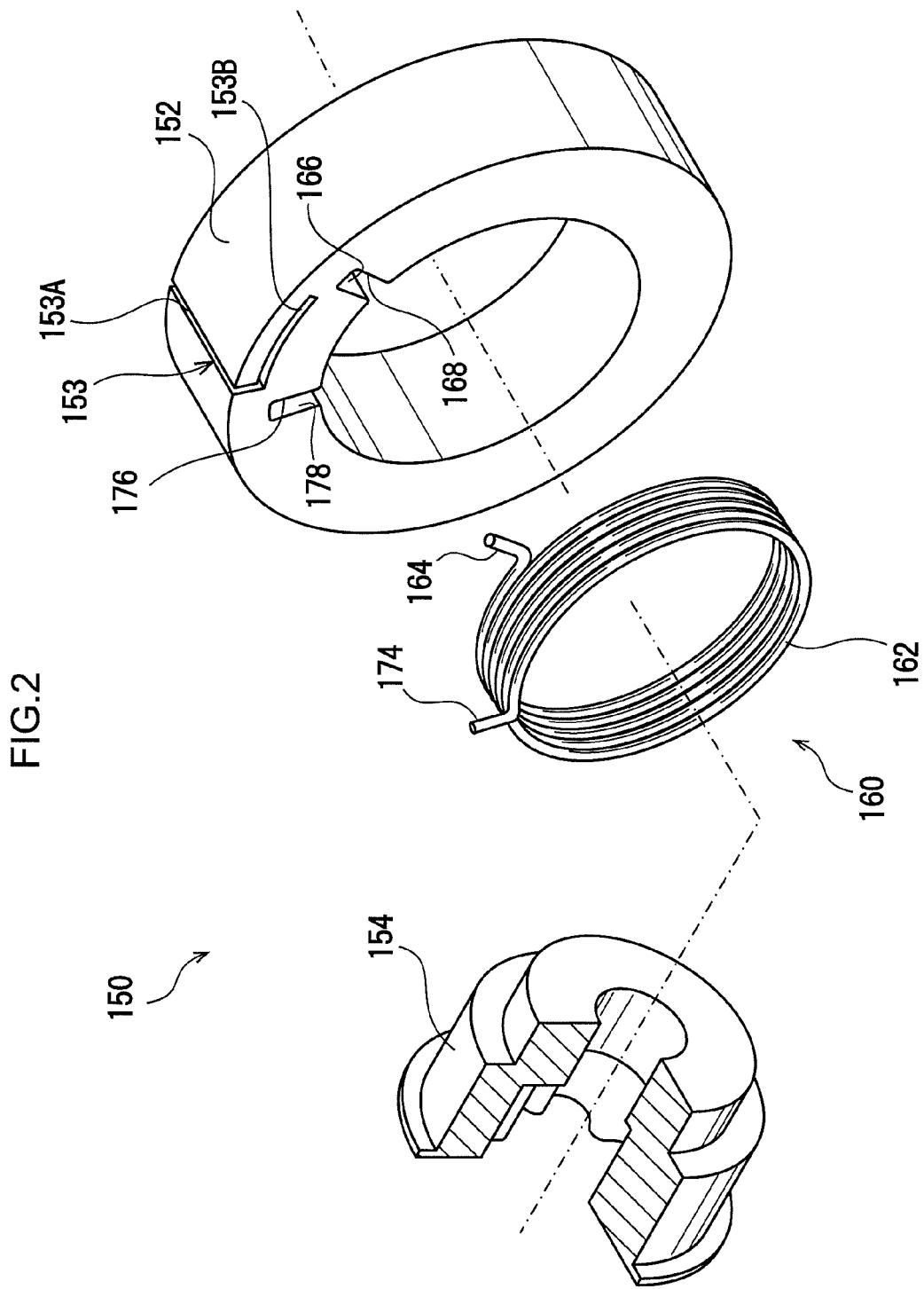
FIG. 2 is an enlarged exploded perspective view illustrating a second rotating body and portions in the vicinity thereof.

The ring 152 is penetrated by the shaft portion 104 of the adaptor 56, and is supported by the shaft portion 104 so as to be coaxial to the shaft portion 104 and capable of relative rotation with respect to the shaft portion 104. As illustrated in FIG. 1, FIG. 2 and FIG. 4 respectively, an engagement groove 153 is formed at the ring 152. As illustrated in FIG. 2 and FIG. 4, the engagement groove 153 includes a radial direction groove 153A. One end of the radial direction groove 153A opens onto an outer peripheral face of the ring 152. The orientation of the radial direction groove 153A from the one end side to the other end side is substantially along the ring 152 radial direction.

A circumferential direction groove 153B is formed continuously to the other end of the radial direction groove 153A and extends in the take-up direction. The circumferential direction groove 153B is curved with the center (axial center) of the ring 152 as the center of curvature. There is accordingly no remarkable change in the diameter dimension of the ring 152 at the outside of the circumferential direction groove 153B. The rigidity and mechanical strength of the ring 152 are accordingly stabilized at the outside of the circumferential direction groove 153B.

The engagement groove 153 is thus configured overall with a bent or curved in a hook shaped profile. The engagement groove 153 is open at both axial direction end faces of the ring 152, and a leading end of the portion that is bent towards the ring 152 radial direction outside opens onto the outer peripheral face of the ring 152. An inside engagement portion 130B corresponding to the engagement groove 153 is formed at a spiral direction inside end portion of the reduction balance spring 130 and in the vicinity thereof.

Figure 4A:
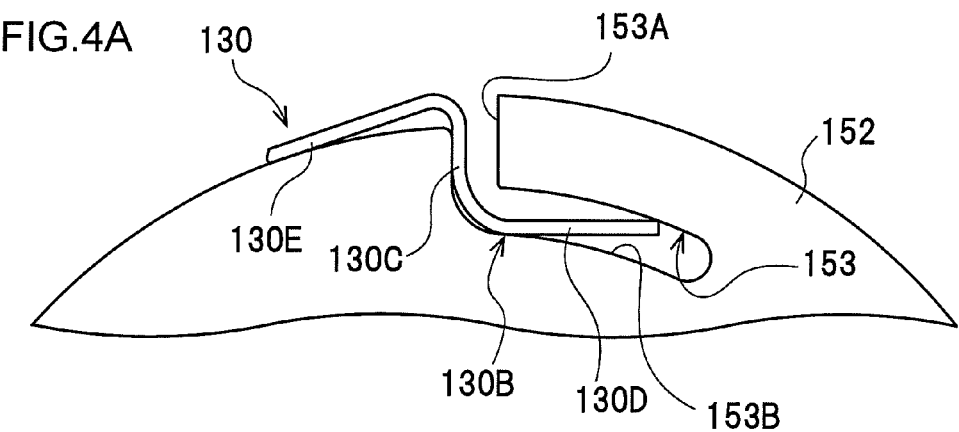
Figure 4B:
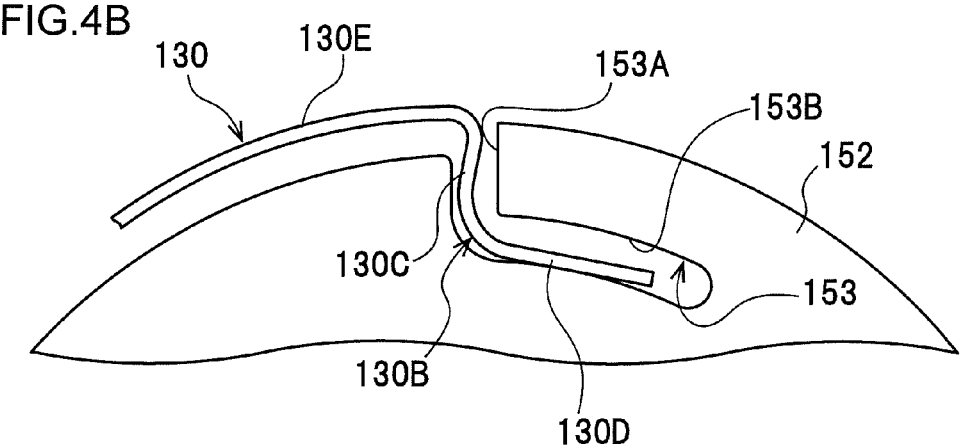
Figure 4C:
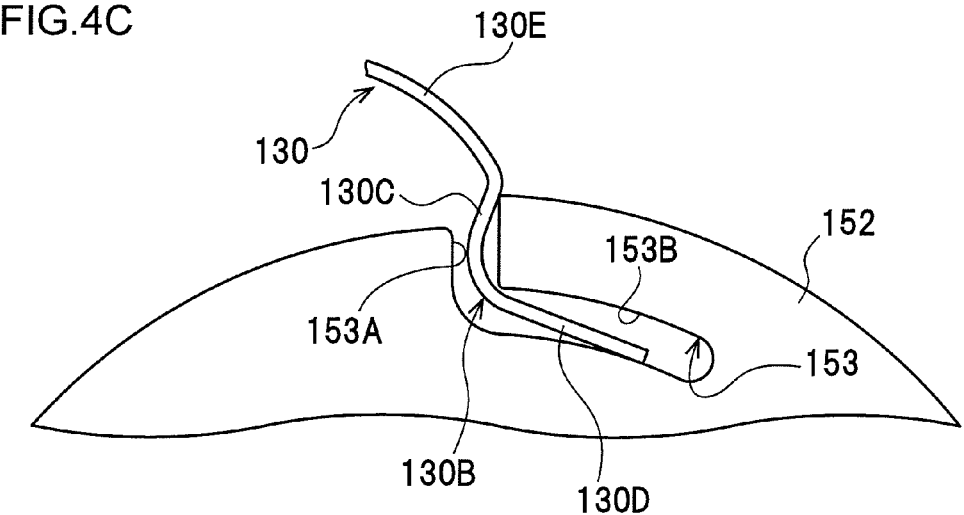

As illustrated in FIGS. 4A, 4B, 4C, the inside engagement portion 130B includes a radial direction extension portion 130C. The radial direction extension portion 130C is formed continuously from an end portion which is at the opposite side to the main body portion of the reduction balance spring 130 via a load absorption portion 130E that is set at the spiral direction inside of the reduction balance spring 130. In an assembled state of the ring 152 and the reduction balance spring 130, the radial direction extension portion 130C is set (disposed) at the inside of the radial direction groove 153A of the engagement groove 153.

A circumferential direction extension portion 130D is continuously formed to an end portion of the radial direction extension portion 130C which end portion is on the opposite side to the load absorption portion 130E (namely an end portion of the radial direction extension portion 130C, which is at the radial direction inside of the ring 152). The circumferential direction extension portion 130D is formed by bending or curving the inside engagement portion 130B into a substantially right angle at the end portion of the radial direction extension portion 130C which end portion is on the opposite side to the load absorption portion 130E. In the assembled state of the ring 152 and the reduction balance spring 130, the circumferential direction extension portion 130D is set (disposed) inside the circumferential direction groove 153B of the engagement groove 153.

Note that the circumferential direction extension portion 130D is formed in a flat plate shape with no curve, in contrast to the circumferential direction groove 153B that is curved as described above.

The respective groove width (opening width) dimensions of the radial direction groove 153A and the circumferential direction groove 153B of the engagement groove 153 are set sufficiently larger than the respective thickness dimensions of the radial direction extension portion 130C and the circumferential direction extension portion 130D of the inside engagement portion 130B. For example, the respective opening width dimensions of the radial direction groove 153A and the circumferential direction groove 153B are set about three times the respective thickness dimensions of the radial direction extension portion 130C and the circumferential direction extension portion 130D.

The circumferential direction groove 153B is set longer than the circumferential direction extension portion 130D, such that even if for example the radial direction extension portion 130C contacts a take-up direction side face of the radial direction groove 153A, the leading end of the circumferential direction extension portion 130D does not contact the leading end of the circumferential direction groove 153B. The inside engagement portion 130B of the reduction balance spring 130 is accordingly capable of turning (rotating) inside the engagement groove 153 of the ring 152 about an axis whose axial direction is the same direction as the axial center of the ring 152.

Moreover, the length of the circumferential direction extension portion 130D is set such that, in a state in which the radial direction extension portion 130C has contacted a pull-out direction side face of the radial direction groove 153A, a base end side of the circumferential direction extension portion 130D (a portion, at the radial direction extension portion 130C side, of the circumferential direction extension portion 130D) contacts a face of the circumferential direction groove 153B which face is at the center side in the radial direction of the ring 152, further in this state, the leading end of the circumferential direction extension portion 130D contacts a face of the circumferential direction groove 153B which face is at the outer side in the radial direction of the ring 152.

As illustrated in FIG. 1 and FIG. 2, the clutch 150 includes a clutch wheel 154. The clutch wheel 154 is configured with a circular shaped outer peripheral profile. The clutch wheel 154 enters inside the ring 152 in a coaxial state to the support portion 102, and the clutch wheel 154 is assembled to the ring 152 in this state. The clutch wheel 154 is penetrated by a non-circular shaped rotation disable portion 158 that is interposed between a main body portion of the adaptor 56 and the support portion 102, thereby restricting relative rotation of the clutch wheel 154 with respect to the adaptor 56.

A clutch spring 160 serving as a clutch section is disposed to the inside of the ring 152 and to the outside of the clutch wheel 154. The clutch spring 160 is formed from a wire member with spring properties and a circular shaped cross-section overall profile. Note that there is no limitation of the cross-section profile of the wire member configuring the clutch spring 160 to a circular shape, and configuration may be made with a quadrangle shape. The clutch spring 160 includes a spring main body 162. The spring main body 162 is formed in a coil shape with axial direction oriented in the same direction as the spool 18 axial direction. A spring side pressing portion 164 extends from one end of the spring main body 162 towards the spring main body 162 radial direction outside. A pressing portion housing portion 166 is formed to the ring 152 corresponding to the spring side pressing portion 164.

The pressing portion housing portion 166 is formed in a groove shape that is open at an inner peripheral portion of the ring 152, and that is open at both axial direction end portions of the ring 152. An opening width dimension of the pressing portion housing portion 166 along the ring 152 circumferential direction is set larger than an external diameter dimension of a portion of the wire member forming the clutch spring 160, that configures the spring side pressing portion 164. The spring side pressing portion 164 can accordingly be housed inside the pressing portion housing portion 166 in a state in which a gap is present between the spring side pressing portion 164 and the two wall portions of the pressing portion housing portion 166 that face along the ring 152 circumferential direction.

Out of the two wall portions of the pressing portion housing portion 166 that face along the ring 152 circumferential direction, the wall portion positioned further towards the take-up direction with respect to the spring side pressing portion 164 configures a ring side load receiving portion 168 serving as a second rotating body side load receiving portion. The ring side load receiving portion 168 is pressed in the take-up direction by the spring side pressing portion 164 when the clutch spring 160 rotates in the take-up direction.

A spring side load receiving portion 174 extends from the other end of the spring main body 162 towards the spring main body 162 radial direction outside. A load receiving portion housing portion 176 is formed to the ring 152 corresponding to the spring side load receiving portion 174.

The load receiving portion housing portion 176 is formed in a groove shape that opens onto an inner peripheral portion of the ring 152, and that opens at both axial direction end portions of the ring 152. An opening width dimension of the load receiving portion housing portion 176 along the ring 152 circumferential direction is set larger than an external diameter dimension of a portion of the wire member that forms the clutch spring 160, configuring the spring side load receiving portion 174. The spring side load receiving portion 174 can accordingly be housed inside the load receiving portion housing portion 176 in a state in which a gap is present between the spring side load receiving portion 174 and the two walls of the load receiving portion housing portion 176 that face along the ring 152 circumferential direction.

Of the two wall portions of the load receiving portion housing portion 176 that face along the ring 152 circumferential direction, the wall portion positioned further towards the pull-out direction with respect to the spring side load receiving portion 174 configures a ring side pressing portion 178 serving as a second rotating body side pressing portion. The ring side pressing portion 178 presses the spring side receiving portion 174 in the take-up direction when the ring 152 rotates in the take-up direction.

The positions for forming the spring side pressing portion 164 and the spring side load receiving portion 174 of the clutch spring 160, and the positions for forming the pressing portion housing portion 166 and the load receiving portion housing portion 176 of the ring 152 are set such that: even if the spring side pressing portion 164 contacts the ring side load receiving portion 168 in a non-wound up state of the spring main body 162, the spring side load receiving portion 174 is separated from the wall portion on the opposite side to the ring side pressing portion 178, of the two wall portions of the load receiving portion housing portion 176; and even if the spring side load receiving portion 174 contacts the ring side pressing portion 178, the spring side pressing portion 164 is separated from the wall portion on the opposite side to the ring side load receiving portion 168, of the two wall portions of the pressing portion housing portion 166 of the ring 152.

Moreover, the load receiving portion housing portion 176 and the pressing portion housing portion 166 are set such that each have depth dimensions from opening ends onto the inner peripheral portion of the ring 152 to ring 152 radial direction outside bottom portions that are of greater depth than a length that is larger one of the extension dimensions of the spring side pressing portion 164 and the spring side load receiving portion 174 from the spring main body 162.

Operation and Advantageous Effects of the Present Exemplary Embodiment

Explanation follows regarding operation and advantageous effects of the present exemplary embodiment.

In the webbing take-up device 10, when an occupant seated in a vehicle seat pulls the leading end side of the webbing 20 in order to wear the webbing 20 on their body, thereby pulling the webbing 20 out from the spool 18, the spool 18 rotates in the pull-out direction. When the spool 18 rotates in the pull-out direction, the adaptor 56 rotates in the pull-out direction, thereby rotating the spiral direction inside end portion of the take-up spring 50 in the pull-out direction with respect to the spiral direction outside end portion. The take-up spring 50 is accordingly wound up, and the biasing force biasing the spool 18 towards the take-up direction via the adaptor 56 gradually increases.

The clutch wheel 154 rotates in the pull-out direction due to the adaptor 56 rotating in the pull-out direction in this manner. Due to the clutch spring 160 making sliding contact with an outer peripheral portion of the clutch wheel 154, the clutch spring 160 rotates in the pull-out direction together with the clutch wheel 154 due to friction between the outer peripheral portion of the clutch wheel 154 and the clutch spring 160. When this occurs, the ring 152 to which the one end of the clutch spring 160 is anchored rotates in the pull-out direction.

Since the spiral direction inside end portion of the reduction balance spring 130 is anchored to the ring 152, when the ring 152 rotates in the pull-out direction, the spiral direction inside end portion of the reduction balance spring 130 rotates in the pull-out direction. The spiral direction outside end portion of the reduction balance spring 130 is anchored to the anchor wall 109 of the reducing spring unit 90, and therefore when the spiral direction inside end portion of the reduction balance spring 130 rotates in the pull-out direction, the ratchet gear 92 rotates in the pull-out direction due to friction between the reduction balance spring 130 and the inner peripheral portion of the ratchet portion 106. Namely, in this state, even though the rotation force of the spool 18 in the pull-out direction is transferred to the ratchet gear 92, since the ratchet gear 92 simply rotates in the pull-out direction, no particular change arises in the reduction balance spring 130.

Next, when sufficient of the webbing 20 has been pulled out and wrapped around the body of the occupant, and the tongue provided to the webbing 20 has been mounted to the buckle device, the ECU then places the solenoid 110 in the current flowing (energized) state based on an electrical signal from the buckle switch that is provided to the buckle device. When the plunger 112 is pulled into the solenoid 110 by the magnetic field generated by the current flowing solenoid 110, the pawl 114, of which the coupling tab 122 is engaged with the leading end side of the plunger 112, swings in the engagement direction against the biasing force of the return spring 124. The rotation restricting tab 120 of the pawl 114 accordingly engages with the ratchet teeth formed to the outer peripheral portion of the ratchet portion 106, thereby restricting rotation of the ratchet gear 92 in the take-up direction.

In this state, when releasing of the pulling force that is being applied to the webbing 20 in order to pull out the webbing 20 by the occupant (when the occupant stops pulling on the webbing 20), looseness in the webbing 20 is released by the biasing force of the take-up spring 50 rotating the spool 18 in the take-up direction via the adaptor 56. Due to rotating the adaptor 56 in the take-up direction, the clutch wheel 154 rotates in the take-up direction, and the clutch spring 160 that is in sliding contact with the outer peripheral portion of the clutch wheel 154 rotates in the take-up direction due to friction between the clutch spring 160 and the outer peripheral portion of the clutch wheel 154.

When the clutch spring 160 rotates in the take-up direction together with the clutch wheel 154, the ring side load receiving portion 168 of the ring 152 is pressed by the spring side pressing portion 164 of the clutch spring 160 in the take-up direction. When the ring 152 accordingly rotates in the take-up direction, the spiral direction inside end portion of the reduction balance spring 130 that is anchored to the ring 152 rotates in the take-up direction.

Due to the clutch spring 160 rotating in the take-up direction as described above, the winding of the clutch spring 160 loosens with respect to the clutch wheel 154. However, the biasing force of the clutch spring 160 is set such that even in the winding loosened state, the rotation torque the clutch spring 160 receiving due to friction with the outer peripheral portion of the clutch wheel 154 is greater than the torque of the reduction balance spring 130. Accordingly, the clutch spring 160 rotates in the take-up direction even when the wind-up with respect to the clutch wheel 154 is loosened due to rotating in the take-up direction. The spiral direction inside end portion of the reduction balance spring 130 accordingly rotates in the take-up direction.

The spiral direction outside end portion of the reduction balance spring 130 is anchored to the anchor wall 109 of the reducing spring unit 90, and moreover, rotation of the ratchet gear 92 in the take-up direction is restricted. Accordingly, in this state, the spiral direction outside end portion of the reduction balance spring 130 does not rotate when the spiral direction inside end portion of the reduction balance spring 130 rotates in the take-up direction.

The reduction balance spring 130 is configured such that the direction from the spiral direction outside to the spiral direction inside is as the take-up direction. Accordingly, when the spiral direction inside end portion of the reduction balance spring 130 rotates in the take-up direction relative to the spiral direction outside end portion, the reduction balance spring 130 is wound up, thereby increasing a biasing force attempting to rotate the spiral direction inside end portion in the pull-out direction. The thus arising (increased) biasing force of the reduction balance spring 130 is a force attempting to rotate the ring 152 that is anchored to the spiral direction inside end portion of the reduction balance spring 130 in the pull-out direction, namely a biasing force opposing the take-up spring 50.

A portion of, or all of, the biasing force of the take-up spring 50 is cancelled out by the biasing force of the reduction balance spring 130, thereby reducing the force attempting to rotate the spool 18 in the take-up direction, and reducing the force pulling the webbing 20 that is being worn on the body of the occupant towards the base end side. The tightening (static tightening force) that the webbing 20 applies to the occupant is accordingly reduced.

The webbing 20 is pulled when the body of the occupant wearing the webbing 20 moves. When the spool 18 rotates in the pull-out direction due to pulling the webbing 20, the take-up spring 50 is wound up, and the force biasing the spool 18 in the take-up direction, and the force tightening the body of the occupant with pulling the webbing 20, increases. However, since in the webbing take-up device 10, the biasing force of the reduction balance spring 130 cancels out the biasing force of the take-up spring 50, an increase in the tightening force (dynamic tightening force) of the webbing 20 when the body of the occupant moves and pulls on the webbing 20 can be suppressed.

When the biasing force of the reduction balance spring 130 becomes greater than the biasing force of the clutch spring 160, due to the ring 152 rotating in the take-up direction by the biasing force of the take-up spring 50, the ring side load receiving portion 168 of the pressing portion housing portion 166 presses the spring side pressing portion 164 of the clutch spring 160 towards the pull-out direction side, and the wind-up of the spring main body 162 is loosened.

Accordingly, the mechanical coupling between the clutch wheel 154 and the ring 152 by the clutch spring 160 is released until the size of the biasing force of the reduction balance spring 130 becomes the size of the biasing force of the clutch spring 160 or below, and the ring 152 rotates in the pull-out direction due to the biasing force of the reduction balance spring 130. Accordingly, a state in which the reduction balance spring 130 is wound up with the size of the biasing force thereof being larger than the size of the biasing force of the clutch spring 160 is not maintained. The load that acts on the reduction balance spring 130 can accordingly be reduced.

When the occupant removes the tongue from the buckle device in order to remove the webbing 20 from their body, the ECU stops current flow in the solenoid 110 based on an electrical signal from the buckle switch provided to the buckle device. When current flow in the solenoid 110 stops so the magnetic field around the solenoid 110 disappears, the pawl 114 rotates (swings) due to the biasing force of the return spring 124, and the rotation restricting tab 120 moves away from the ratchet teeth formed to the outer peripheral portion of the ratchet portion 106. When the take-up direction rotation restriction of the ratchet gear 92 is thereby released, the reduction balance spring 130 rotates the ratchet gear 92 in the take-up direction due to the biasing force of the reduction balance spring 130.

When, in a substantially released state of the biasing force of the reduction balance spring 130, the ratchet gear 92 rotates further in the take-up direction due to inertia, the ratchet gear 92 rotates the reduction balance spring 130 in the take-up direction.

The inside engagement portion 130B of the reduction balance spring 130 that is set inside the engagement groove 153 in order to connect the reduction balance spring 130 and the ring 152 is capable of rotating (turning) inside the engagement groove 153 about an axis with the same axial direction as the ring 152 axial center. Accordingly, as illustrated in FIG. 4B, the load absorption portion 130E that is positioned further to the reduction balance spring 130 main body side than the inside engagement portion 130B rotates in the take-up direction whilst moving away from the outer peripheral portion of the ring 152 accompanying loosening (releasing of winding up) of the reduction balance spring 130. When this occurs, the inside engagement portion 130B rotates (turns) in the take-up direction about an axis that has the same axial direction as the ring 152 axial center.

When the inside engagement portion 130B has thus turned until the radial direction extension portion 130C of the inside engagement portion 130B contacts the take-up direction side portion of the engagement groove 153, the load absorption portion 130E stands up (namely, the load absorption portion 130E moves away from the outer peripheral face of the ring 152), and the load absorption portion 130E moreover curves so as to open up towards the pull-out direction under the load from the reduction balance spring 130 main body portion side.

In this state, when further load in the take-up direction from the reduction balance spring 130 main body portion side acts on the load absorption portion 130E, the load absorption portion 130E undergoes resilient deformation so as to curve further. This deformation absorbs the load in the take-up direction from the reduction balance spring 130 main body portion side.

The load in the take-up direction that is transmitted from the reduction balance spring 130 main body portion side to the inside engagement portion 130B accordingly decreases, and unwanted deformation of the inside engagement portion 130B, in particular buckling of the inside engagement portion 130B, can be prevented or effectively suppressed.

In particular, in the present exemplary embodiment, as illustrated in FIG. 4A, in the state of the inside engagement portion 130B of the reduction balance spring 130 set inside the engagement groove 153 of the ring 152, the radial direction extension portion 130C abuts the pull-out direction side face of the radial direction groove 153A, the base end side of the circumferential direction extension portion 130D abuts the ring 152 radial direction center side face of the circumferential direction groove 153B, and the leading end of the circumferential direction extension portion 130D abuts the ring 152 radial direction outside face of the circumferential direction groove 153B. Due to the inside engagement portion 130B thus abutting these respective locations inside the engagement groove 153, when the load absorption portion 130E behaves so as to rotate in the take-up direction whilst moving away from the outer peripheral face of the ring 152, readily inducing turning of the inside engagement portion 130B as described above.

Moreover, from the point of view of connecting the reduction balance spring 130 and the ring 152, the engagement groove 153 and the inside engagement portion 130B are bent or curved into a hook shape as described above. The inside engagement portion 130B accordingly does not readily come out from the engagement groove 153.

When load in the take-up direction that has been transmitted from the reduction balance spring 130 main body portion side to the inside engagement portion 130B is transmitted from the inside engagement portion 130B to the ring 152, the ring 152 rotates in the take-up direction. When the ring 152 rotates in the take-up direction in this manner, the ring side pressing portion 178 accordingly presses the spring side load receiving portion 174 in the take-up direction. When the spring side load receiving portion 174 is pressed in the take-up direction, the spring main body 162 is loosened, thereby reducing the friction between the clutch spring 160 and the clutch wheel 154. In this state, the clutch spring 160 can easily rotate relative to the clutch wheel 154.

The ring 152 that presses the spring side load receiving portion 174 of the clutch spring 160 also rotates easily due to receiving rotation force from the ratchet gear 92 that is rotating in the take-up direction under inertia via the reduction balance spring 130. Accordingly, even when the ratchet gear 92 rotates in the take-up direction under inertia, the reduction balance spring 130 and the ring 152 rotate together with the ratchet gear 92, due thereto, the load acting on the reduction balance spring 130 can be reduced even when the ratchet gear 92 rotates in the take-up direction under inertia.

What is claimed is:

1. A webbing take-up device comprising:
   a spool that takes up a webbing;
   a take-up spring that biases the spool in a take-up direction that takes up the webbing;
   a reduction balance spring configured by a spiral spring, that is wound up due to a spiral direction inside end of the reduction balance spring rotating toward one side of a rotation direction with respect to a spiral direction outside end of the reduction balance spring;
   a first rotating body to which is anchored the spiral direction outside end of the reduction balance spring;
   a restricting section that restricts rotation of the first rotating body toward the one side of the rotation direction due to a tongue provided at the webbing being mounted to a buckle; and
   a second rotating body that is coaxial and capable of relative rotation with respect to the first rotating body, and that is coupled to the spool, the second rotating body rotating toward the one side of the rotation direction due to the spool rotating in the take-up direction, wherein:
   an engagement groove, into which is inserted the spiral direction inside end of the reduction balance spring, is formed at the second rotating body,
   the second rotating body rotates accompanying the spiral direction inside end, and
   inside the engagement groove, the spiral direction inside end is capable of moving in a circumferential direction of the rotation direction and in a radial direction of the rotation direction, wherein:
   the spiral direction inside end of the reduction balance spring configures a hook shaped portion comprising
   a radial direction extension portion that extends from a main body portion of the reduction balance spring towards a center side in the radial direction of the second rotating body, and
   a circumferential direction extension portion that extends from an end portion of the radial direction extension portion, which end portion is at the opposite side from the main body portion, towards the one side of the rotation direction of the second rotating body; and
   the engagement groove is formed to comprise
   a radial direction groove whose one end opens at an outer peripheral face of the second rotating body, and whose another end is set at an inner side in the radial direction of the second rotating body, a groove width of the radial direction groove being set larger than a thickness dimension of the radial direction extension portion of the reduction balance spring that is inserted from the one end of the radial direction groove, and
   a circumferential direction groove whose base end is connected to the another end of the radial direction groove, and whose leading end is positioned further to the one side of the rotation direction of the second rotating body than the base end, a groove width of the circumferential direction groove being set larger than a thickness dimension of the circumferential direction extension portion of the reduction balance spring, and a length from the base end to the leading end of the circumferential direction groove being set longer than a length of the circumferential direction extension portion.

2. The webbing take-up device of claim 1, wherein a shape of the circumferential direction groove is set such that
   the circumferential direction groove is curved with a center of curvature of the circumferential direction groove being further to a center side of the second rotating body than the circumferential direction groove of the second rotating body, and
   in a state in which the radial direction extension portion is in contact with a face of the radial direction groove which face is at the another side of the rotation direction, a portion at the base end side of the circumferential direction extension portion contacts a face of the circumferential direction groove which face is at a radial direction center side of the second rotating body, and the leading end of the circumferential direction extension portion contacts a face of the circumferential direction groove which face is at a radial direction outer side of the second rotating body.

3. The webbing take-up device of claim 2, wherein the center of curvature of the circumferential direction groove is set as an axial center of the second rotating body.

4. A webbing take-up device comprising:
a spool that takes up a webbing;
a take-up spring that biases the spool in a take-up direction that takes up the webbing;
a reduction balance spring configured by a spiral spring, that is wound up due to a spiral direction inside end of the reduction balance spring rotating toward one side of a rotation direction with respect to a spiral direction outside end of the reduction balance spring;
a first rotating body to which is anchored the spiral direction outside end of the reduction balance spring;
a restricting section that restricts rotation of the first rotating body toward the one side of the rotation direction due to a tongue provided at the webbing being mounted to a buckle; and
a second rotating body that is coaxial and capable of relative rotation with respect to the first rotating body, and that is coupled to the spool, the second rotating body rotating toward the one side of the rotation direction due to the spool rotating in the take-up direction; and
an engagement groove that is formed at the second rotating body, and into which is inserted the spiral direction inside end of the reduction balance spring,
the engagement groove being configured such that, at a time of release of winding up of the reduction balance spring, a portion of the reduction balance spring which portion is in the vicinity of the spiral direction inside end stands up so as to extend in a radial direction of the second rotating body while the spiral direction inside end moves inside the engagement groove before the spiral direction inside end contacts an inner face, which is at the one side in the rotation direction, of the engagement groove, wherein:
the spiral direction inside end of the reduction balance spring configures a hook shaped portion comprising
a radial direction extension portion that extends from a main body portion of the reduction balance spring towards a center side in the radial direction of the second rotating body, and
a circumferential direction extension portion that extends from an end portion of the radial direction extension portion, which end portion is at the opposite side from the main body portion, towards the one side of the rotation direction of the second rotating body; and
the engagement groove is formed to comprise
a radial direction groove whose one end opens at an outer peripheral face of the second rotating body, and whose another end is set at an inner side in the radial direction of the second rotating body, a groove width of the radial direction groove being set larger than a thickness dimension of the radial direction extension portion of the reduction balance spring that is inserted from the one end of the radial direction groove, and
a circumferential direction groove whose base end is connected to the another end of the radial direction groove, and whose leading end is positioned further to the one side of the rotation direction of the second rotating body than the base end, a groove width of the circumferential direction groove being set larger than a thickness dimension of the circumferential direction extension portion of the reduction balance spring, and a length from the base end to the leading end of the circumferential direction groove being set longer than a length of the circumferential direction extension portion.

5. The webbing take-up device of claim 4, wherein a shape of the circumferential direction groove is set such that
the circumferential direction groove is curved with a center of curvature of the circumferential direction groove being further to a center side of the second rotating body than the circumferential direction groove of the second rotating body, and
in a state in which the radial direction extension portion is in contact with a face of the radial direction groove which face is at the another side of the rotation direction, a portion at the base end side of the circumferential direction extension portion contacts a face of the circumferential direction groove which face is at a radial direction center side of the second rotating body, and the leading end of the circumferential direction extension portion contacts a face of the circumferential direction groove which face is at a radial direction outer side of the second rotating body.

6. The webbing take-up device of claim 5, wherein the center of curvature of the circumferential direction groove is set as an axial center of the second rotating body.

* * * * *